3,250,310
AUXILIARY WHEEL BUFFER INSIDE A TIRE
Tilden William Johnson, 5630 Sawtelle Blvd.,
Culver City, Calif.
Filed Jan. 11, 1965, Ser. No. 424,747
5 Claims. (Cl. 152—158)

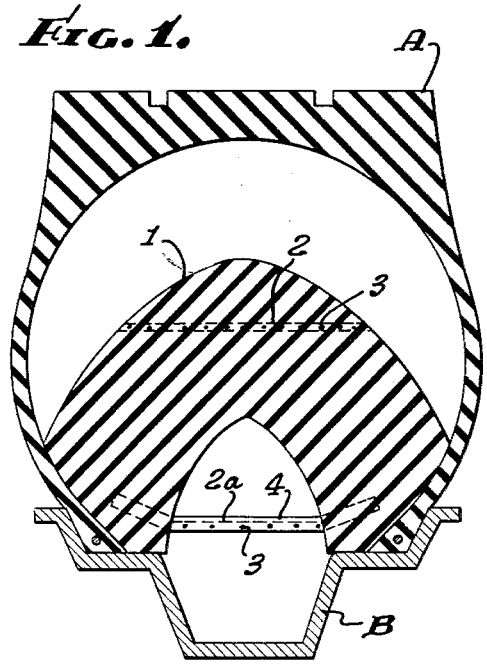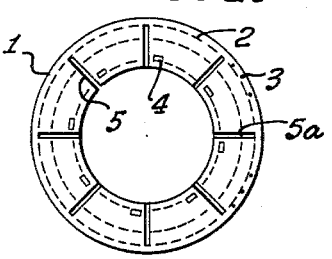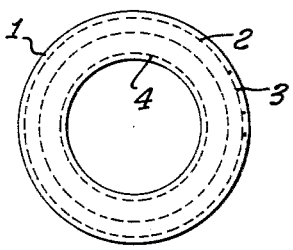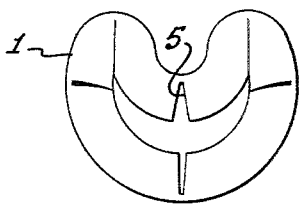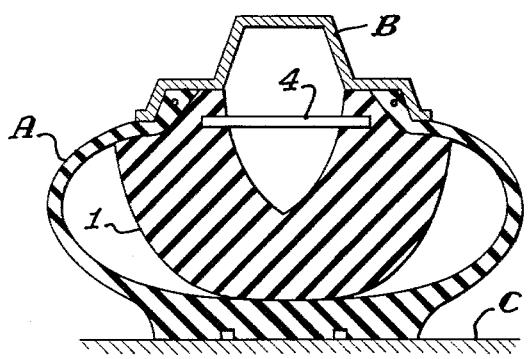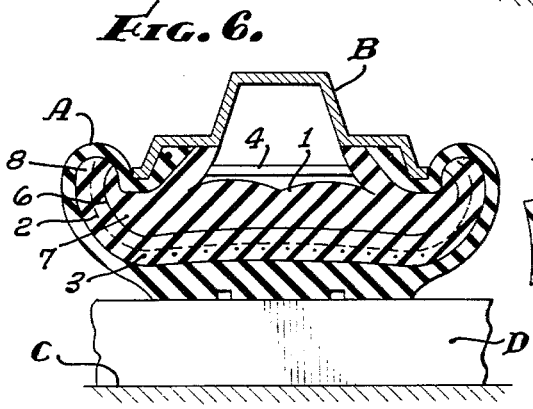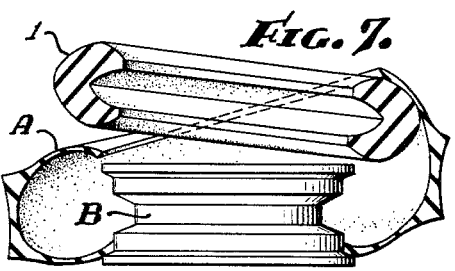

This invention relates to a novel flexible rim extension cap, that constitutes in fact an auxiliary wheel inside an enclosing tire, to buffer tires in case of loss of air in pneumatic assemblies and to prevent braking upsets from suddenly greatly reduced wheel or tire diameters and to prevent loss of car equilibrium following a pneumatic tire blowout, and thus to provide higher all-around factors of safety for pneumatic wheel assemblies.

This is a continuation-in-part application, and discloses and claims subject matter disclosed in my earlier filed pending application Ser. No. 175,926, filed February 27, 1962, now Patent No. 3,172,447.

As current space flights demonstrate any object tends to remain at rest unless force is applied to give it momentum or speed in any direction, and once it is in motion tends to remain in motion unless some force acts upon it in opposition to its motion. The unusual aspect of this fact is that if an object is suddenly given ten times as much speed as another like object, it requires ten squared or 100 times as much force, not merely ten times as much force. Thus when a car changes from 5 miles per hour to 100 miles per hour, it requires twenty squared or 400 times as much impact force. For these reasons fast moving wheels that may roll over a concrete ridge as high as a baseball bat must be extremely flexible at their outer periphery so the sudden upward acceleration of the entire weight of the vehicle takes place more slowly, and further the weight of the item that must accelerate upward on the tire or buffer or rim must be very light or its weight alone greatly adds to the impact force. Steel buffers, for example, that are unable to yield locally and must carry the entire weight of the wheel and axle prior to the body spring are subject to road forces on impact over a steel rail of a hundred thousand pounds for a few thousandths of an inch which would bend a steel buffer strong enough to support a freight car on a smooth rail track.

For these reasons in the past swiftly moving vehicle wheels have had to be designed so a circumferentially unbroken tire was mated to a circumferentially unbroken rim, and as long as the balloon tire remained inflated and kept the iron rim about 5 inches from the road, the combination was highly efficient, but in case of a sudden blowout vehicle equilibrium was often lost at high speed and difficult to regain and braking efficiency greatly reduced and dangerous.

Prior art has attempted to solve these problems by solid rubber buffers bearing on the base of the rim and in the rim drop center, and with steel buffer extension of the rim and with air tires inside of tires. All of these methods have proved difficult to install and inadequate in that a solid buffer bearing on the rim base or even supported by a tube from the rim base takes up too much enclosed air space and prevents the iron rim from radiating heat from the enclosed air caused by tire flexing especially at high speed, and the resulting high temperature of enclosed air especially at high speed melts the rubber and vulcanization of the enclosing tire causing the enclosing tire to wear out or fail in only a few thousand or hundreds of miles. While steel buffers would run cool, hammerlike million pound forces created by running over say a steel railroad rail will bend steel buffers permanently and cut through the enclosing tire casing. A tire within a tire can fail without the driver's notice subjecting it to dirt wedging on curves and be punctured by long nails.

To overcome these dangerous defects in factor of safety of modern wheel rims and tires, I have invented a novel method of constructing and installing wide, high, flexible and adequate strength rim extension caps or auxiliary wheel buffers inside pneumatic tires, by utilizing the rim flanges as a bearing base and lateral location so that the factor of safety is greatly increased, the object of this invention.

Other objects and advantages of this invention will further become apparent hereinafter and in the drawings in which:

FIGURE 1 shows a cross section view of a combat type buffer that substantially locates and holds two reinforced solid rubber tires on the rim seats adjacent to the inside beads and adjacent sidewalls of a tubeless tire. This type structure which resembles an arch or inverted letter U with its legs spread to resemble an inverted letter V when shock loaded or loaded causes the sidewalls of the buffer to crush over the enclosing tire over the tire retaining flange like an inverted letter Y whereby said tire retaining flanges hold said buffer in lateral location. To achieve this effect substantial thickness is required in the sidewalls and tread material so when load forces the tread radially axleward it wedges the sidewalls over the rim tire retaining flanges. Therefore shape and thickness is important.

FIGURE 2 shows a side elevation view of construction whereby radial slots across the beads and adjacent sidewalls of the rim extension or buffer enables it to fold up as in FIGURE 4 so it can be placed inside a tubeless tire and buffer then installed as a unit on a two piece rim, or with more effort installable on a wide, deep drop center rim.

FIGURE 3 shows the same tire buffer or rim extension in elevation view without the slits that can be used with tubeless tires with extensible tire beads and sidewalls.

FIGURE 4 shows an elevation view of buffer folding in order to place inside a tire. When a solid unyielding steel rim is encircled, it is obvious that in use the buffer or rim extension regains a desired rigid state throughout its bead structure.

FIGURE 5 shows a cross section view of the wheel running deflated on a smooth road with normal load. Note prestressing or precompressing the buffer structure causes the buffer to substantially retain its shape under this normal load which reduces heat buildup as unnecessary buffer flexing is prevented.

FIGURE 6 shows a cross section view of how the buffer folds when encountering a shock load like running over a 4 inch by 4 inch timber or steel rail, concrete ridge or sidewalk curb. Note the buffer can give under shock about 2 inches locally and then regain its shape like a pneumatic tire involving acceleration of only about a pound of buffer weight. Yielding 2 inches locally reduces to a constant force of 2,000 lbs. what would otherwise be a 100,000 lb. hammer like blow from shock for 1/25 of an inch, developed from such obstruction at speeds of 60 to 80 miles per hour. Note how structure and reinforcement increase resistance to deflection and greater restorative power after shock load.

FIGURE 7 illustrates in cross section how the buffer is installed in a tubeless tire on a drop center rim. While the buffer retains an unbroken circumferential cap for simplicity of illustration only half of the buffer is shown and bead bracing structure is omitted.

Referring to the drawings by letters and numbers:

The letter "A" represents a tire or tubeless tire of either the inextensible or extensible bead type and is no part of this invention, except to show how the buffer combines with the tire and rim.

The letter "B" represents any rim for illustration and is no part of this invention.

The letter "C" represents a road surface for illustration.

The letter "D" represents a concrete, steel or timber about 4 inches by 4 inches in width and height and illustrates how such impact forces effects the buffer structure and how the rim flanges bear the load on the wheel in shock loads.

Numeral 1 represents the rubber or similar synethetic material carcass of the rim extension cap and/or tire buffer of this invention. This simplest construction will be modified by addition of other features or reinforcement as follows: The buffer tread and sidewalls on the outer side should be constructed of the hardest rubber (as expressed in rubber Shores) of sufficient thickness so that in conjunction with its arch shape, the buffer under normal load will substantially hold its shape without undue flexing. Then underneath this hard rubber exterior on the inside of the buffer more resilient rubber can be used whereby when a shock load deforms the hard shore rubber exterior, the more resilient rubber underneath will react to force the buffer back to its normal arch shape at the termination of the shock load. This structure should be of such a nature that the hard shore rubber exterior of the buffer sidewalls upon shock load will pass as one leg of an inverted letter Y over the top of the tire retaining flange whereas the softer rubber underlayer attached to the rim bead seat or held by lateral bracing will form the inside leg of said letter Y when inverted. Thus the tire retaining flange can be utilized for bearing load, and lateral location.

Numeral 2 represents cross section synthetic reinforcement. In some cases it is restricted to the cap alone; in other cases it extends to buffer beads, and in some cases entirely circles the cross section as use and capacity required may dictate, when the synthetic material used in the tire buffer structure is sufficient this reinforcement may be omitted.

Numeral 2a represents buffer bead separation reinforcement laterally. It may be synthetic or in some constructions spring steel.

Numeral 3 represents wheel rolling circumferential synthetic reinforcements, and the number and use in the tire buffer will depend on capacity required and condition adapted to in use.

Numeral 4 represents the entire structure extending laterally from bead to bead of the buffer used in some cases to push the inside tire bead to an airtight fit by bolt tightening pressure from two piece rims, while this brace could be continuous circumferentially in most cases it will consist of one or more separate braces. It prevents dirt wedging in dirt curve negotiation.

Numeral 5 represents slits or slots radially across the rim cap extension or tire buffer's rim seat beads and adjacent sidewall so the buffer will collapse as in FIGURE 4 for insertion inside a tubeless tire so both can be fitted to a rim as a unit. These slits or slots one or more in number provide for air circulation in the tubeless tire to the rim cooling surface.

These slits may be at an angle such as 45 degrees so one bead brace as in item 4 can be removed for folding and reinserted after placement of the buffer on the rim for return to rigidity.

Numeral 5a represents apertures for air circulation between the rim drop center and the enclosed air between the buffer and enclosing tire.

Numeral 6 represents the dividing line cross section wise between an outer layer of hard Shore durometer tested rubber having a high Rockwell rating for hardness to carry loads and shock loads to the tire sidewalls on and laterally outside the rim flange tops, and an inner buffer layer of more resilient rubber for greater resistance to deflection and greater restorative power.

Numeral 7 represents the inner buffer layer of resilient rubber of less Rockwell hardness as measured on a Shore durometer.

Numeral 8 represents the outer harder layer of rubber of the buffer cross section to provide more bearing capacity of the arch created by the U shape of the buffer, and transfer load outside the tire flange and take up slack in a deflated tire, see FIGURE 6.

To install the buffer for use on two piece rims, the lateral brace can be constructed nearer the tire bead seat, and if an extensible tire sidewall and bead tubeless tire is used, the buffer can be used without radially slotting its beads as the tubeless tire can be stretched over the integral buffer, and the tire and buffer then installed as a unit on said two piece rim.

When the buffer is to be used with the usual drop center rim as shown on the drawing without a removable flange, and the tubeless tire has substantially inextensible beads, it will be necessary to use a buffer with the beads and sidewalls slit radially enough towards the tread cap to fold load into the tire and to be forceable laterally over the rim tire retaining flange. (See FIGURES 1 thru 4). It should be noted that when slit that, sidewise pressure will force the buffer beads sidewise into the cavity of the tire so that first a tubeless tire can be regularly installed on a regular drop center rim. This will seat both tubeless tire beads on the rim. Then remove the inside tubeless tire bead and expand laterally about 12 inches so the folded buffer will pass inside the tubeless tire, and then utilizing the flexible sections of the buffer slit beads and sidewall, and softer inner layer of rubber, force the buffer inside the rim closure. (See FIGURE 7 on the drawing.) Then use a high pressure sidewall tire installing machine or bar to apply sidewall pressure so that the slit buffer bead and sidewall sections are forced sidewise into the buffer cavity and the slit buffer section forced over the enclosing tubeless tire sidewall and opposite tire retaining flange. Force the unit far enough laterally to permit the uninstalled tubeless tire bead to reach the drop center of the rim on one half of the combination and then install the tubeless tire bead over the rim. Then inflate, and the inflation will force the buffer in place where it will remain until said tire pressure machine or hand bar is used to reverse the process and make tire and buffer removal possible.

The advantage to be gained from this particular buffer construction is that substantial wheel drop in case of loss of air is reduced by utilizing the top of the tire retaining flange to bear the loads imposed on the buffer and to hold the buffer in lateral location. (This high location makes possible greater flexibility from solid tire structure. A further advantage of using the retaining flange to support the buffer instead of the drop center or rim tire bead seats is that the size of the buffer is reduced increasing tire and rim enclosed air space. A further advantage of using the tire flange is that the buffer can be provided with apertures or holes to let air circulate between air space in the rim drop center and the top of the enclosing tire. This will provide means whereby the iron surface of the drop center and the rim can be used to radiate heat from the enclosed air made hot by flexing of the tire at high speed. This will make possible greater mileage from enclosing tires as enclosing tires run longer if the enclosed air temperature is reduced. Since danger from blowouts will be reduced enclosing tires can be operated safely until all tread is used instead of discarding thousands of miles of good tire treads to prevent now dangerous blowouts. The size of the buffer when so located prevents dirt wedging in dirt curve negotiation, and the increased weight makes the wheel run steadier on the road.

It should be noted that when reinforced hard Shore rubber is used along the outer cross section of said buffer causes the load to be applied at points laterally outside the tire retaining flanges that the resultant of forces tends to pull the softer more flexible rubber or synthetic material on the inside cross section of said buffer upward from the tire rim bead seat. The same result occurs where spring steel bracing means are used as applying the load to a spring laterally outside the tire retaining flange tends to cause the said steel brace to seesaw over the top of the tire retaining flange and thus pull up from the rim tire bead seat. It should also be noted per these specifications and claims said buffer may be located on only one tire retaining flange instead of both tire flanges as except for increased stability the bracing structure will hold one buffer on one sidewall only without a buffer on the other rim flange, to achieve this result place tire cap over a rim flange and brace. It should be noted it is permissible to substitute spring steel bracing for synthetic bracing slightly altering the shape of the buffer. The shape of the steel bracing may also be altered to meet given conditions.

The location of the lateral bead braces will vary radially from the bead seat on the rim to just a little higher than the top of the rim flange, depending on whether the buffer is to be used with a drop center or removable flange rim. This lateral bead brace for installation purposes on buffers for drop center rim will be located near the top of the rim tire retaining flange.

Several embodiments have been described varying as to type of rim and tire to be used with and inflation pressure and tonnage of vehicle used. The preferred embodiment therefore is that most adapted to the class of use for which constructed. However, it should be noted a single continuous buffer structure as shown in FIGURE 3 can be used with the new type of tubeless tires with one bead and sidewall annulus extensible as the extensible bead and sidewall annulus can be stretched over the buffer and the unit then installed readily on a drop center rim with one removable flange, especially a rim specifically designed for such a combination.

From the foregoing detailed description and drawings, it is apparent I have invented a novel rim extension cap, wide, high, flexible and stable for forces in all directions possessing desirable flexible yielding capacities that fills the requirements and object of this invention to provide greater all-around factors of safety from tire blowouts and resulting braking upsets.

Having now described and illustrated one form of my invention and various species thereof, I wish it to be understood that my invention is not to be limited to the specific form or arrangement of parts herein described and shown, or specifically covered by my claims.

The detailed description of the particular embodiments of the invention illustrated and described herein is not to be construed as limiting the invention thereto. The invention includes all features of patentable novelty residing in the foregoing description and the accompanying drawings.

Having thus described my invention, what I claim and desire to secure by Letters Patent of the United States is:

1. In combination, a rim having mounted thereon a tubeless tire and a buffer constructed of flexible material reinforced with synthetic material positioned interiorly of said tire, said buffer, being U-shaped and including a tread cap and two laterally braced, thick, sidewall portions, said side wall portions being sufficiently thick so that when placed in operative position where each side wall portion abuts a tire bead seat, when the buffer encounters shock loads, the side wall portions crush radially and axially over the tire side walls and over the tire retaining flanges, said lateral bracing consisting of a plurality of braces located near the top of the tire retaining flange and being constructed of synthetic or spring steel material, said buffer being laterally braced at the top by utilizing the intersection of said side wall braces as the buffer cap.

2. A buffer as in claim 1 in which said buffer also includes a radially outer portion having a greater Shore hardness than the radially inner portion to provide greater resistance to deflection and greater restorative power, if deflected.

3. A buffer as in claim 2 in which said buffer having construction means to reduce flexing heat-up of enclosed air by restricting buffer and enclosing tire contact to shock loads and the substantially non-flexing tire sidewalls and beads immediately adjacent to the top of the rim tire retaining flanges and providing said buffer with one or more apertures through which heated enclosing tire air can circulate to the said rim so said heat can radiate outside the enclosed air.

4. A buffer as in claim 3 in which said buffer also including at least one slit extending radially from the portion contacting the bead seat to enable the buffer to be folded for installation.

5. In combination, a drop center rim having mounted thereon a tubeless tire and a buffer constructed of flexible material reinforced with synthetic material positioned interiorly of said tire, said buffer being U-shaped and including a tread cap and two laterally braced, thick, sidewall portions, said side wall portions being sufficiently thick so that when placed in operative position where each side wall portion abuts a tire bead seat, when the buffer encounters shock loads, the side wall portions crush radially and axially over the tire side walls and over the tire retaining flanges, said buffer also including at least one slit extending radially from the portion contacting the bead seat to enable the buffer to be folded for installation, said buffer also including a radially outer portion having a greater Shore hardness than the radially inner portion to provide greater resistance to deflection and greater restorative power, if deflected, said lateral bracing being located near the top of the tire retaining flange and being constructed of synthetic or spring steel material.

References Cited by the Examiner

UNITED STATES PATENTS

| | | | |
|---|---|---|---|
| 1,860,362 | 5/1932 | Jones | 152—158 |
| 2,067,545 | 1/1937 | Ricketts | 152—158 |
| 2,224,066 | 12/1940 | Shore | 152—158 |
| 2,242,788 | 5/1941 | Marks | 152—158 |
| 2,308,959 | 1/1943 | Brink | 152—158 X |

ARTHUR L. LA POINT, *Primary Examiner.*

C. W. HAEFELE, *Assistant Examiner.*